United States Patent [19]

Theuman

[11] 4,271,563

[45] Jun. 9, 1981

[54] SHELLFISH EXTRACTION TOOL

[75] Inventor: James L. Theuman, Katy, Tex.

[73] Assignee: Markay International, Inc., Katy, Tex.

[21] Appl. No.: 114,907

[22] Filed: Jan. 24, 1980

[51] Int. Cl.³ ............................................. A22C 29/00
[52] U.S. Cl. ............................................. 17/71; 17/66
[58] Field of Search ........................ 17/66, 71; 30/1

[56] References Cited

U.S. PATENT DOCUMENTS

| | | | |
|---|---|---|---|
| 1,546,975 | 7/1925 | Feller | 17/66 X |
| 2,707,325 | 5/1955 | Cripps | 17/71 X |
| 4,200,961 | 5/1980 | Mueller | 17/66 X |

Primary Examiner—Willie G. Abercrombie
Attorney, Agent, or Firm—Browning, Bushman & Zamecki

[57] ABSTRACT

A shellfish meat extraction tool having an elongated body portion which is manually grasped by the user, a connecting portion extending from one end of said body portion, and a unique meat extraction blade formed at the outermost extremity of said connecting portion.

6 Claims, 4 Drawing Figures

U.S. Patent  Jun. 9, 1981  4,271,563
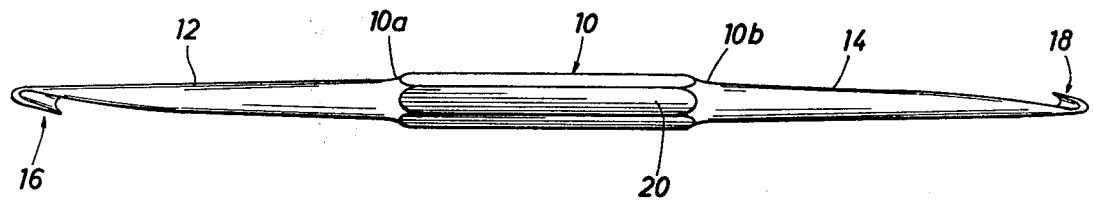
FIG. 1
FIG. 3
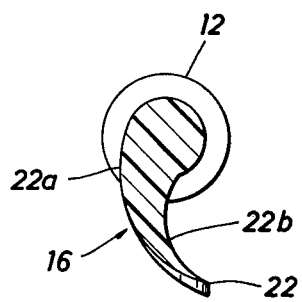
FIG. 2
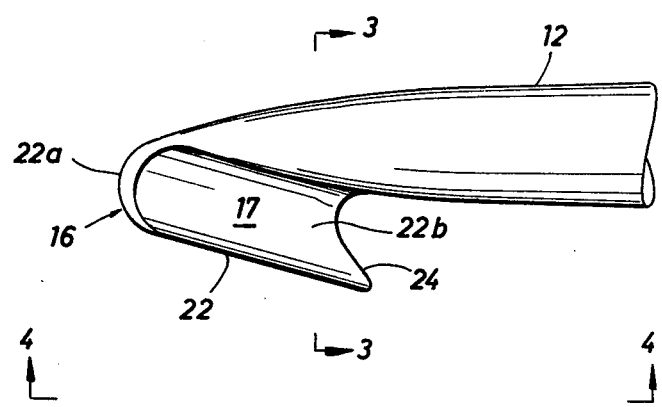
FIG. 4
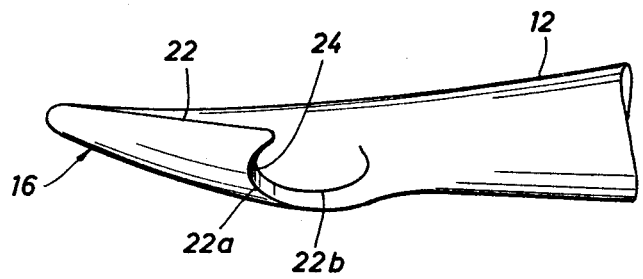

SHELLFISH EXTRACTION TOOL

BACKGROUND OF THE INVENTION

The present invention relates to a new and improved implement for shellfish meat extraction. More specifically, this new implement is a uniquely designed tool for easily cutting and dislodging edible portions of meat from small recesses in shellfish, such as crab and lobster.

Except for the tail and claw portions of the lobster, much of the edible meat product of these shellfish is present within small recesses and niches in the shell and appendages. This is particularly true with respect to shellfish such as crabs. The meat in these confined recesses is normally inaccessible by use of conventional knives, forks or other implements without extensive cracking and breaking of the shell. This extensive breakage of the shell is a tedious, inefficient and cumbersome procedure. The meat extracted in this manner is also necessarily broken down into small bits and morsels, and frequently contains small pieces of shell. Furthermore, this process does not lend itself to desirable etiquette and is particularly embarassing when dining in public restaurants. Often, a significant amout of edible meat product is ignored by the consumer due to the lack of a neat, convenient and efficient method for extracting meat from these smaller confined areas of the shell.

Accordingly, a device which offers a convenient means for cutting and removing shellfish meat from small recesses with a minimum of cracking and breaking of the shell or tearing and crushing of the meat is highly desirable.

Prior art related to overcoming the difficulty of dislodging and extracting meat from the shell of a lobster is described in U.S. Pat. No. 2,707,325 to Cripps. The Cripps patent discloses a lobster pick comprising a handle and a flexible blade with an obliquely angled tip for scooping and pulling the meat from the shell. The Cripps lobster pick, utilizing a blunt raking hook formed at its tip, is not practical for dislodging meat from small recesses or nitches in the shell. Moreover, because of the raking and scraping technique which must be employed by the user for effective results, significant forces must be exerted in extracting the meat, thereby subjecting it to unnecessary tearing and mutilation.

U.S. Pat. No. 4,047,397 to Laliberte discloses a crochet needle which resembles, in some respects, the meat extraction tool of the present invention. However, the lack of appropriately formed cutting blades at the extremities of the needle clearly distinguish this patent from the present invention. The Laliberte invention is not at all suitable to the extraction of meat from shellfish due to the blunt, rounded tips which are incorporated at the extremities of the needle.

SUMMARY OF THE INVENTION

Accordingly, it is an object of the present invention to provide an improved shellfish meat extraction tool.

A further object of the present invention is to provide a shellfish meat extraction tool which may be conveniently employed to remove meat from shellfish recesses with a minimum of cracking and breaking of the shell.

Another object of the present invention is to provide a shellfish meat extraction tool which efficiently removes the meat with a minimum of tearing, breaking or mutilation of the meat.

The above and other objects of the present invention will become readily apparent from the ensuing description, the drawing and the appended claims.

The shellfish meat extraction tool of the present invention comprises an elongated body portion for grasping with one's hand, a connecting portion extending from one end of said elongated body portion, and a unique cutting blade located at the outer extremity of the connecting portion. The cutting blade extends laterally of the tool in a generally curvilinear shape, with the outermost edge forming a knife-like edge to accomplish a severing action as the tool is rotated within the recess in the shell. In a typical manner of use, the tool is inserted into an exposed portion of the shellfish at an interference of the shell and the meat, with a twisting or rotating action. As the blade is rotated and advanced towards the bottom of the cavity, the meat is completely separated from its attachment within the shell. The tool is then withdrawn in a scooping manner bringing with it the loosened portion of meat which remains intact throughout the removal process. Ripping, breaking and tearing of the meat is eliminated by the unique cutting means employed in this invention, and permits the most effective and complete removal of the meat from the smallest of shell cavities.

In a preferred embodiment, this shellfish meat extraction tool features first and second connecting portions extending from each end of the elongated body portion, with an integrally formed cutting blade as described above, at the outer extremity of each connecting portion. In this configuration, the two cutting blades located at opposite ends of the tool are formed in differing proportions to allow the user a choice as to which blade best suits the size of shellfish cavity from which the meat product is to be extracted.

BRIEF DESCRIPTION OF THE DRAWING

FIG. 1 is an elevational view of a shellfish meat extraction tool according to the present invention.

FIGS. 2-4 are enlarged views of the cutting means incorporated at each end of the meat extraction tool of FIG. 1.

FIG. 2 is a side elevational view of an integrally formed cutting blade at an extremity of the meat extraction tool.

FIG. 3 is a cross sectional view of the cutting blade taken at 3—3 of FIG. 2.

FIG. 4 is a third angle projection of the cutting blade as viewed from 4—4 in FIG. 2.

DESCRIPTION OF THE PREFERRED EMBODIMENTS

Reference is now made to the drawing for a detailed description of a preferred embodiment of the present invention. With reference to FIG. 1, the shellfish meat extraction tool comprises an elongated body portion, shown generally as 10, a first connecting portion 12, a second connecting portion 14, a first cutting means, shown generally as 16, and a second cutting means, shown generally as 18. The body portion 10 includes flat planar surfaces 20 (typical), which are parallel to the longitudinal centerline of the body portion, arranged in a peripheral manner about the circumference of the body portion to provide a positive gripping means for manual manipulation of the tool. While body 10 is shown as an upset portion of larger diameter, it is apparent that such is not necessary. Body 10 may simply be formed by the extension of connecting portions 12 and 14, thus having the same diameter as the innermost ends of said connecting portions. It is further appreciated that the body portion of the tool need only be formed in such a manner as to accommodate convenient grasping by the hand of the user. Likewise, alternates to the hexagonal cross section of the body portion 10, as shown, for providing a positive gripping means, such as depressions, cross hatching or alternative cross sectional shapes, will be apparent to one skilled in the art. The first connecting portion 12 extends coaxially from a first end 10a of body portion 10, tapering to a minimum cross sectional area at its extremity. Likewise, the second connecting portion 14 extends coaxially from a second end 10b of body portion 10 and is tapered in a similar manner.

Referring to FIGS. 2, 3 and 4, the enlarged views of the cutting means clearly depicts the unique formation of the first cutting means 16 incorporated at the extremity of the first connecting portion 12. While enlarged details of the second cutting means 18 are not shown, it is understood that said second cutting means 18 is formed in an identical manner, although it may be proportionally scaled to a size larger or smaller than that of the first cutting means 16. As depicted in FIG. 2, the cutting means 16 comprises a portion 17 having a generally curvilinear cross section, laterally extended with respect to the tool and, more specifically the longitudinal axis of the connecting portion 12. The portion 17 decreases in thickness as the distance from the tool axis increases, ultimately forming a cutting edge 22 at the intersection of outer and inner curvilinear surfaces 22a and 22b, respectively. As shown in FIG. 2, and the third angle projection of FIG. 4, surfaces 22a and 22b which define the portion 17, and which intersect to form the cutting edge 22, are inclined and offset at oblique angles with respect to the axis of the connecting portion 12 for maximum efficiency and effectiveness in severing meat from narrow shellfish cavities as the tool is rotated. In addition, the curvature of the cutting means 16 as described and shown in FIGS. 2-4 provides a scoop-like feature which is designed to assist in lifting or pulling the shellfish meat from its recesses within the shell. An undercut portion 24, as shown in FIG. 4, is incorporated as a means for hooking and further securing the severed meat for withdrawal from the shell.

While it is apparent to those familiar with the art that numerous modifications to the above described apparatus may be effected without departing from the spirit or scope thereof, it is intended that this invention be limited only by the following claims.

I claim:
1. A shellfish meat extraction tool comprising:
    (a) a body portion for manual grasping;
    (b) at least one connecting portion extending from one end of said body portion; and
    (c) a first cutting means formed at the outer extremity of the one connecting portion, said first cutting means comprising curvilinear lateral extension at the extremity of the one connecting portion, with the outermost edge of said lateral extension forming a cutting edge which is inclined with respect to said one connecting portion.
2. A shellfish meat extraction tool as recited in claim 1 wherein said body portion includes:
    (a) an upset portion of greater diameter with respect to said connecting portion; and
    (b) gripping means comprising a plurality of planar surfaces generally disposed circumferentially about the periphery of said upset portion.
3. A shellfish meat extraction tool as recited in claim 1, including:
    (a) a second connecting portion extending from a second end of said body portion; and
    (b) a second cutting means formed at the outer extremity of the second connecting portion, said second cutting means comprising a curvilinear lateral extension at the extremity of the second connecting portion, with the outermost edge of said lateral extension forming a cutting edge which is inclined with respect to said second connecting portion.
4. A shellfish meat extraction tool as recited in claim 2, including:
    (a) a second connecting portion extending from a second end of said body portion; and
    (b) a second cutting means formed at the outer extremity of the second connecting portion, said second cutting means comprising a curvilinear lateral extension at the extremity of the second connecting portion, with outermost edge of said lateral extension forming a cutting edge which is inclined with respect to said second connecting portion.
5. A shellfish meat extraction tool as recited in claim 3 wherein said first and second cutting means are of unequal curvilinear proportions.
6. A shellfish meat extraction tool as recited in claim 4 wherein said one and said second connecting portions are tapered, with cross sectional area of said one and second connecting portions decreasing as the distance from said body portion increases.

* * * * *